United States Patent [19]

Shelef et al.

[11] Patent Number: 5,199,396
[45] Date of Patent: Apr. 6, 1993

[54] ENGINE OPERATION INTERRUPT USING AMBIENT OXYGEN SENSING

[75] Inventors: Mordecai Shelef, Bloomfield Village; Eleftherios M. Logothetis, Birmingham, both of Mich.

[73] Assignee: Ford Motor Company, Dearborn, Mich.

[21] Appl. No.: 933,534

[22] Filed: Aug. 24, 1992

[51] Int. Cl.$^5$ .............................................. F02B 77/00
[52] U.S. Cl. ......................... 123/198 D; 123/198 DC
[58] Field of Search ..................... 123/198 D, 198 DC

[56] References Cited

U.S. PATENT DOCUMENTS

| | | | |
|---|---|---|---|
| 4,221,206 | 9/1980 | Hass | 123/198 DC |
| 4,338,526 | 7/1982 | Martin et al. | 307/116 |
| 4,371,051 | 2/1983 | Achterholt | 123/198 DC |
| 4,864,997 | 9/1989 | Miyachi | 123/489 |

*Primary Examiner*—Noah P. Kamen
*Attorney, Agent, or Firm*—Peter Abolins; Roger L. May

[57] ABSTRACT

This invention teaches a system for interrupting operation of the internal combustion engine of a vehicle so as to prevent an undesirably high level of carbon monoxide which would cause a low level of oxygen in the ambient. Engine operation is interrupted when there are simultaneous signals indicating an oxygen level below a predetermined value and an idling condition of the engine.

12 Claims, 4 Drawing Sheets

ENGINE OPERATION INTERRUPT USING AMBIENT OXYGEN SENSING

BACKGROUND OF THE INVENTION

1. Field of the Invention

The invention relates to operation of an internal combustion engine as a function of ambient gases.

2. Prior Art

Not every combustion process, including that which takes place within an internal combustion engine, goes to completion. One product of incomplete combustion is carbon monoxide. Carbon monoxide, when inhaled in sufficient quantities, can have an undesirable effect on the human body. Even though emission control devices have been installed in U.S. automobiles since 1975, idle operation in an enclosed space can cause a condition which results in elevated concentrations of carbon monoxide in the air of the enclosed space. The present invention is aimed at preventing reduced concentrations of oxygen in the ambient.

U.S. Pat. No. 4,221,206 teaches the use of two carbon monoxide (CO) detectors, one electrical and the other electromechanical, and deactivating a vehicle engine only when the signals from both CO detectors signal the presence of CO above a predetermined amount. Such a system may cause undesirable interruption of engine operation when the vehicle is moving as a result of temporarily high CO concentrations originating from passing nearby exhaust gas sources such as heavy-duty vehicles, tractors, or earth moving machinery. It would be desirable to obviate sudden disablement of a moving vehicle triggered by an extraneous event such as being near an exhaust pipe of a heavy-duty vehicle or any other chance source emitting a relatively high concentration of carbon monoxide in the exhaust gas.

FIG. 3 shows, schematically, the time evolution, after initiation of vehicle idling operation in an enclosed space (e.g., a garage), of: (a) the A/F ratio of the engine; (b) the width of the fuel pulse injected sequentially to each engine cylinder; (c) the oxygen concentration in the enclosed space; and (d) the rate of emitted CO as well as the resulting concentration of CO in the enclosed space. After a few seconds following ignition, the A/F ratio is maintained at the stoichiometric value by the feedback controlled fuel metering system. Under this condition, and for a properly functioning three-way catalyst, the production rate of CO is very small (and constant) and its concentration in the enclosed space rises only very slowly.

As time passes, oxygen is depleted from the air in the enclosed space. Consequently, less fuel is required to keep the A/F ratio at stoichiometry, and the width of the fuel pulse will continuously be decreased by the control system. After a certain time $T_1$ has elapsed, the width of the fuel pulse reaches the minimum value specified by the design of the fuel metering system. At that point, the A/F ratio begins to drift into the rich region and the rate of tailpipe CO production rapidly increases for two reasons: first, the concentration of CO in the gas emerging from the engine increases, and, secondly, the efficiency of the three-way catalyst rapidly decreases to zero as the A/F becomes richer and richer. The engine will continue idling until, at time $T_2$, the A/F becomes so rich (e.g., A/F=6) that combustion cannot be maintained. Even though engine operation terminates at this time, the oxygen level may have reached an undesirably low level for occupants in the vehicle passenger compartment. It would be desirable to have a system which would avoid such an oxygen depletion.

SUMMARY OF THE INVENTION

This invention includes a system for the interruption of the operation of an idling and stationary motor vehicle equipped with an internal combustion engine, including the step of sensing when the oxygen level in the surrounding ambient decreases below a predetermined value. The method includes also recognizing an idling condition and interrupting the engine operation when there are simultaneous signals signifying both the predetermined level of oxygen and the idling condition of the engine.

DETAILED DESCRIPTION OF THE INVENTION

Figure 1:
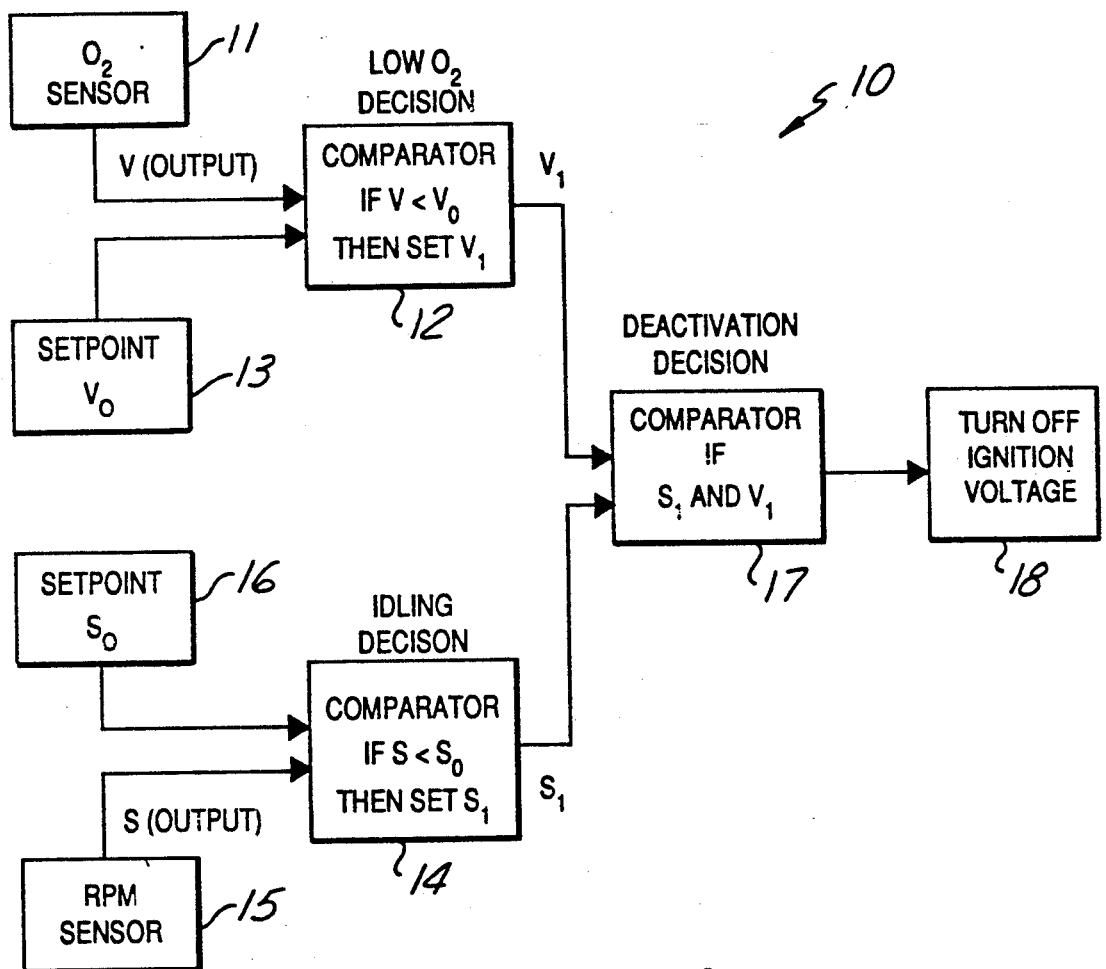
FIG. 1 is a block diagram of a system in accordance with the embodiment of this invention.

Referring to FIG. 1, an electronic engine control system 10 includes an ambient oxygen sensor 11 which is coupled to a comparator 12. Comparator 12 also has an input from a setpoint voltage $V_o$ source 13. If the output of oxygen sensor 11 is less than setpoint $V_o$ source 13, the output of comparator 12 is a set voltage $V_1$ (signifying "low" oxygen concentration in the ambient). An idling decision comparator 14 has a first input from an rpm sensor 15 and a second input from a setpoint $S_o$ source 16. Idling decision comparator 14 determines if the output from the rpm sensor 15, S, is less than $S_o$. If S is less than $S_o$, a set output $S_1$ (signifying engine idling) is sent from comparator 14. The outputs of comparators 12 and 14 are applied to an activation decision block 17 wherein it is determined if the outputs from comparators 12 and 14 are in a set condition. If this is the case, an activation signal from decision block 17 is applied to a block 18 wherein the engine control system ignition is turned off.

Figure 2:
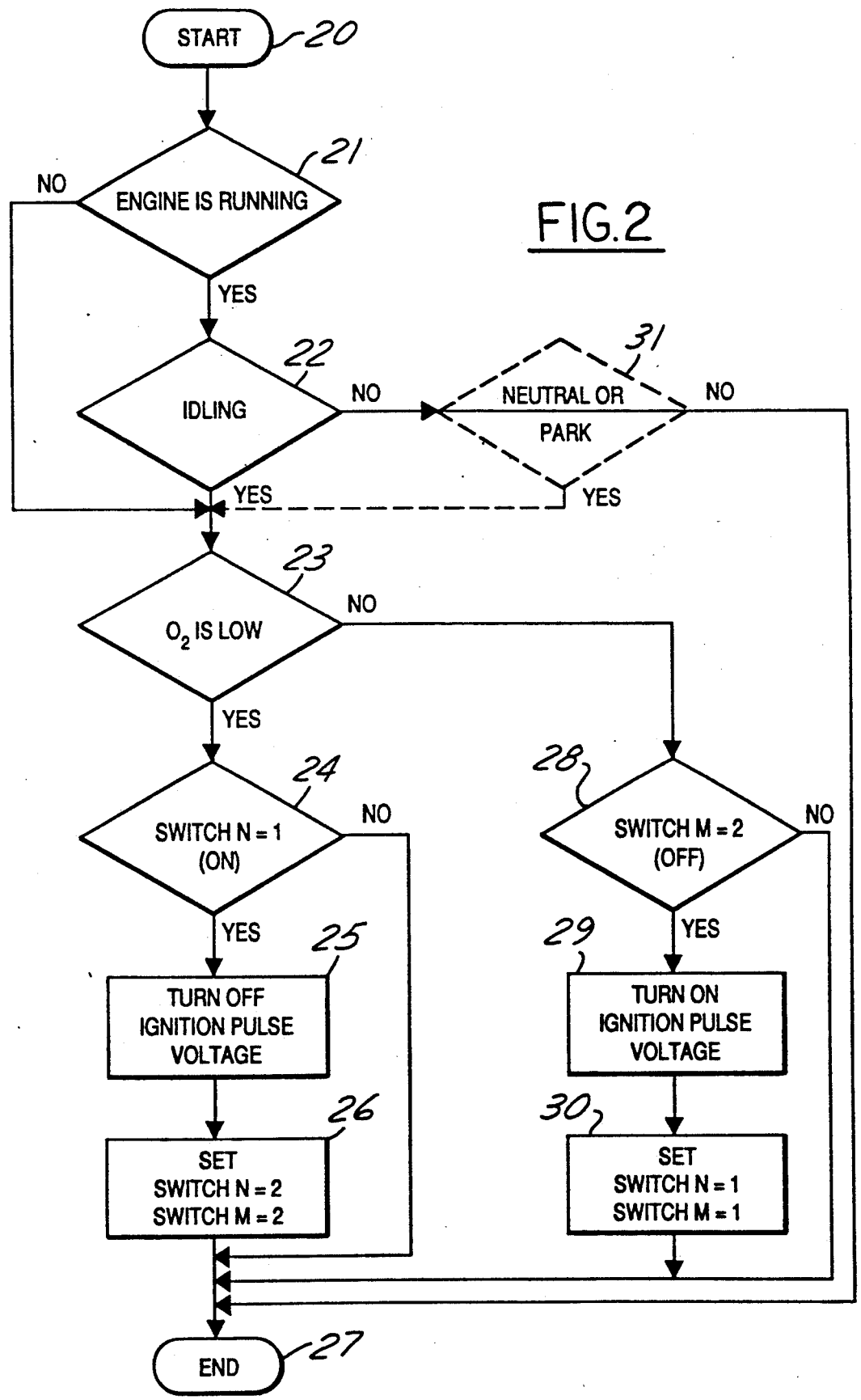
FIG. 2 is a logic flow diagram showing the sequence of events in accordance with an embodiment of this invention.
Figure 3A:
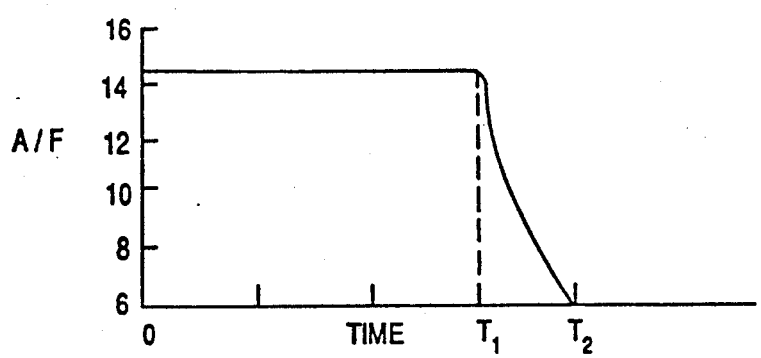
FIG. 3 is a graphic representation versus time of, in FIG. 3A the air/fuel ratio, in FIG. 3B the width of fuel pulse, in FIG. 3C the percent of oxygen, and in FIG. 3D the percent of carbon monoxide.
Figure 3B:
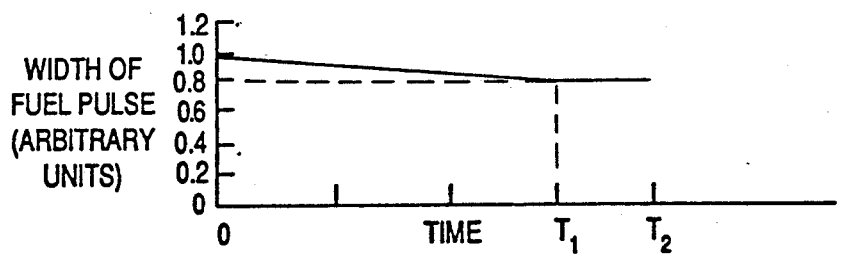
Figure 3C:
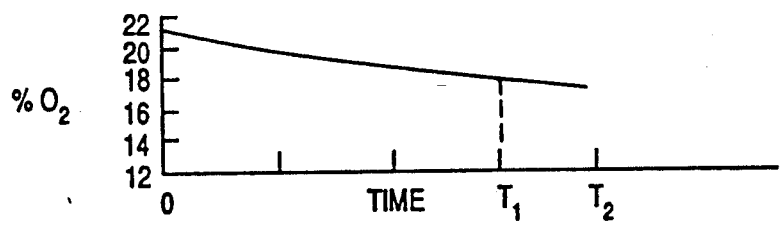
Figure 3D:
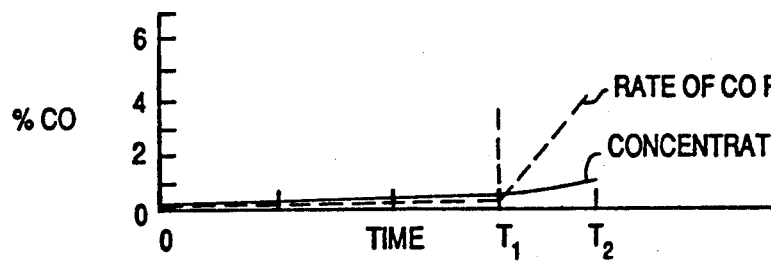
Figure 4:
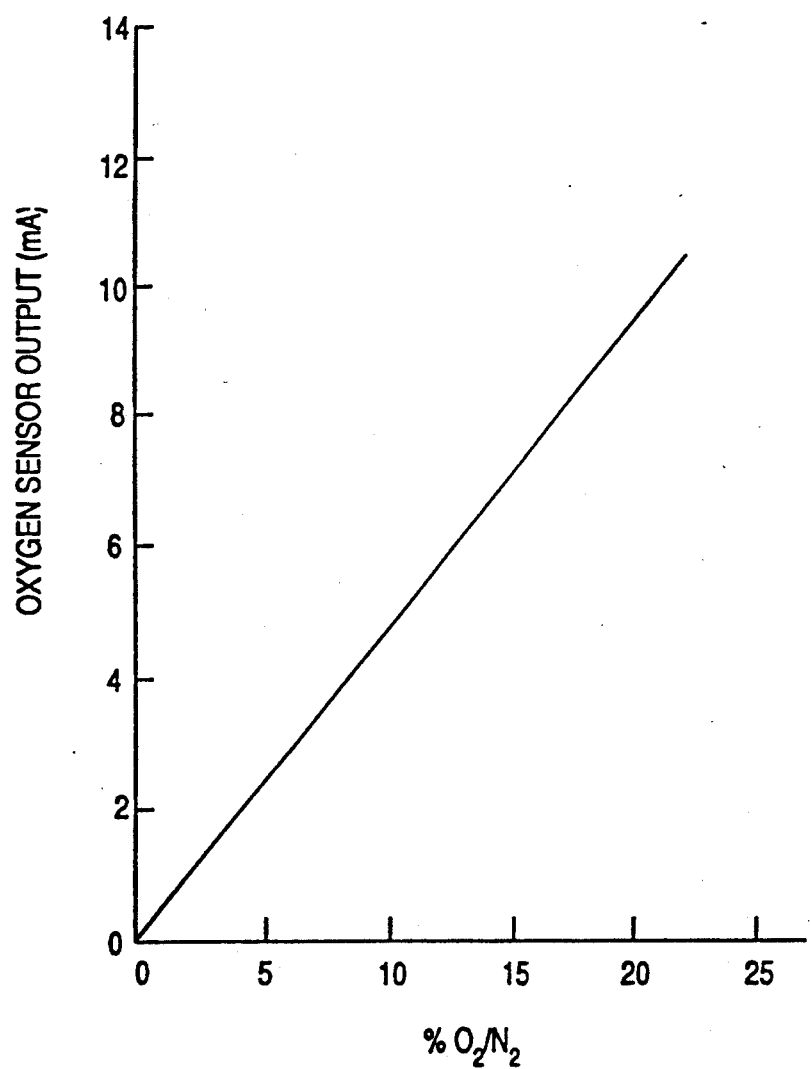
FIG. 4 is a graphic representation of typical characteristics showing the sensitivity characteristics of the sensor suitable for use in an embodiment of this invention.

Referring to FIG. 2, a logic flow diagram shows the sequence of events for operation of the apparatus of FIG. 1. The sequence of events starts at a block 20 and then goes to a decision block 21 where it is asked if the engine is running. If yes, logic flow goes to a decision block 22 where it is asked if the engine is idling. If yes, logic flow goes to a decision block 23 where it is asked if the oxygen level is low. If yes, logic flow goes to a decision block 24 where it is asked if switch N is set to a "1" state, i.e., it is on. If yes, logic goes to a block 25 where the ignition pulse voltage is turned off. Logic flow then goes to a block 26 wherein the switches N and M are set to "2". Designating switch N =2 and M =2 means that the ignition voltage is off. When the switch conditions are N =1 and M =1, the ignition voltage is on. Logic flow from block 26 goes to an end block 27.

Returning to block 21, if the engine is not running, logic flow goes to decision block 23. At block 22, if the engine is not idling, logic flow goes to end block 27. At block 23, if oxygen is not low, logic flow goes to a decision block 28 wherein it is checked to see if switch M is in a off, i.e., a "2" condition. If not, logic flow goes to end block 27. If YES, logic flow goes to a block 29 wherein the ignition pulse voltage is turned on. Logic flow from block 29 goes to a block 30 wherein switches N and M are set equal to "1" indicating that the ignition voltage is on. Returning to block 24, if switch N is not equal to "1", logic flow goes to end block 27.

Referring to FIG. 2, if desired, an optional decision block can be inserted after decision block 22. Decision block 31 is coupled to receive the NO output of decision block 22. At decision block 31, it is asked if the vehicle transmission is in neutral or park. If NO, logic flow goes to N block 27. If YES, logic flow goes to decision block 23 wherein it is checked to see if oxygen is low. This optional decision block 31 may be useful in a case where the accelerator is depressed so that the engine is operating at a relatively high rpm and is not idling, but the transmission gear is in neutral or park. The logic flow from start block 20 to end block 27 can be repeated at some convenient rate.

Engine operation can be terminated in a number of ways. As discussed above, the ignition pulse voltage to the spark plugs may be turned off. Alternatively, voltage pulses to the fuel injectors may be discontinued, the fuel pump may be turned off, or the ignition switch may be turned off. One way of turning off the ignition switch would be to put an additional secondary switch in series with the main ignition or start switch. The secondary switch is then interrupted.

If desired, the vehicle may be equipped with the capability to detect whether the vehicle is moving or not. If such is the case, the above-described engine idle check may be replaced with a vehicle-not-moving check. Still further, it may be desirable to have a subroutine that keeps track of the duration of vehicle idling or stationary nonmovement when the oxygen level is high. Then, when a low oxygen level is detected, engine operation is not terminated unless vehicle idling or stationary condition was occurring for a preset minimum duration of time.

An embodiment of this invention can use an oxygen sensor to monitor the oxygen concentration in the atmosphere ambient to the vehicle, and to provide a signal to the car computer to turn off the engine when the oxygen concentration drops to a preset level. The oxygen sensor can be one of several types, for example, a solid-state sensor based on an oxygen pumping principle with $ZrO_2$ electrochemical cells. A single cell can be used or, if desired, a double cell sensor. The latter device is more accurate because it is less sensitive to temperature and absolute pressure variations. An advantageous location for the oxygen sensor is under the vehicle hood.

The setpoint, signifying the condition for turning the engine off, should be about 18% of oxygen in the ambient and within a range of 16-20%.

As discussed, a signal from an electronic engine module can be used to signify idle engine operation. Additionally, one can use the output of the oxygen sensor. Consequently, in this scheme, the engine operation is terminated when the oxygen sensor indicates an oxygen level below a predetermined value and the engine is idling.

It is conceivable that when the engine is automatically turned off according to the above sequence of events, the driver may attempt to restart the engine. In this case, the engine control computer may be set so that the engine cannot be restarted until signals from the oxygen indicates an absence of the low oxygen condition. Conversely, engine operation is not inhibited when there is an adequate oxygen condition.

We claim:

1. A system for the interruption of the operation of a motor vehicle equipped with an internal combustion engine, including the steps of:
    means for sensing when the oxygen level in the surrounding ambient goes below a predetermined value and providing a first output signal;
    means for recognizing an idling condition of the engine and providing a second output signal; and
    means for interrupting engine operation when the first output signal indicates an oxygen level below the predetermined value and the second output signal indicates an idling engine.

2. A system as recited in claim 1 in which said means for sensing the oxygen level concentration is an electrochemical solid-state sensor attached to the motor vehicle.

3. A system as recited in claim 1 in which said means for interrupting engine operation provides for permitting the resumption of engine operation when the oxygen level in the surrounding ambient rises above the predetermined value.

4. A system as recited in claim 1 where the predetermined level is set in a range between 16 to 20% of oxygen in the ambient.

5. A system as recited in claim 1 wherein said means for recognizing an idling condition includes an electronic engine control.

6. A system as recited in claim 1 further comprising means for sensing engine transmission position in neutral and park, and said means for interrupting engine operation further includes an input to receive an additional signal indicating engine transmission position in neutral or park.

7. A method for interrupting operation of a motor vehicle equipped with an internal combustion engine, including the steps of:
    sensing when the oxygen level in the surrounding ambient goes below a predetermined value and providing a first output signal to indicate such level;
    recognizing an idling condition of the engine and providing second output signal to indicate such level; and
    interrupting engine operation when the first output signal indicates an oxygen level below the predetermined value and the second output signal indicates an idling engine.

8. A method as recited in claim 7 in which said step of sensing the oxygen level concentration uses an electrochemical solid-state sensor of oxygen concentration in the ambient.

9. A method as recited in claim 7 in which said step of interrupting engine operation provides for permitting the resumption of engine operation when the oxygen level in the surrounding ambient rises above the predetermined value.

10. A method as recited in claim 7 where the predetermined level is set in a range between 16 to 20% of oxygen in the ambient.

11. A method as recited in claim 7 wherein said step of recognizing an idling condition includes using an electronic engine control.

12. A method as recited in claim 7 further comprising the step of sensing engine transmission position in a neutral position and a park position, and said step of interrupting engine operation requires sensing an additional signal indicating engine transmission position in one of the neutral position or the park position.

* * * * *